(12) United States Patent
Anota et al.

(10) Patent No.: US 6,695,319 B1
(45) Date of Patent: Feb. 24, 2004

(54) INDEXED SEALING RING FOR PRESSURE COOKER, AND PRESSURE COOKER EQUIPPED THEREWITH

(75) Inventors: Daniel Jean-Marie Anota, Chervigny Saint-Sauveur (FR); Eric Chameroy, Vérones (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 09/762,669
(22) PCT Filed: Aug. 12, 1999
(86) PCT No.: PCT/FR99/01980
§ 371 (c)(1),
(2), (4) Date: Apr. 20, 2001
(87) PCT Pub. No.: WO00/08984
PCT Pub. Date: Feb. 24, 2000

(30) Foreign Application Priority Data

Aug. 13, 1998 (FR) .............................. 98 10481

(51) Int. Cl.$^7$ .................................................. F16J 3/00
(52) U.S. Cl. ..................... 277/628; 277/630; 277/637; 277/641; 220/203.11; 220/203.12; 220/298
(58) Field of Search ................... 220/203.11, 203.12, 220/298, 303, 304; 277/637, 641, 647, 928

(56) References Cited

U.S. PATENT DOCUMENTS

| 4,162,741 | A | * | 7/1979 | Walker et al. .......... 220/298 X |
| 4,276,990 | A | * | 7/1981 | Chiodo ................. 220/298 X |
| 4,592,479 | A |   | 6/1986 | Resende |
| 4,685,587 | A | * | 8/1987 | Sebillotte |
| 5,297,473 | A | * | 3/1994 | Thelen et al. ......... 220/298 X |
| 5,641,085 | A | * | 6/1997 | Lonbardo |

FOREIGN PATENT DOCUMENTS

| DE | 36 18 231 | 12/1987 |
| FR | 2 414 318 | 8/1979 |

* cited by examiner

Primary Examiner—Anthony Knight
Assistant Examiner—E Peavey
(74) Attorney, Agent, or Firm—Lerner, David, Littenberg, Krumholz & Mentlik, LLP

(57) ABSTRACT

An indexing safety gasket (1) designed to be mounted in the lid of a pressure cooker for the purpose of providing sealing at pressure between the lid and the pan of the pressure cooker, the gasket being characterized in that it includes at least one outer notch (25) in its periphery, and means for fastening the gasket (1) relative to the lid so as to index rotation of the gasket (1) to rotation of the lid.

14 Claims, 3 Drawing Sheets

INDEXED SEALING RING FOR PRESSURE COOKER, AND PRESSURE COOKER EQUIPPED THEREWITH

FIELD OF THE INVENTION

The invention relates to pressure cookers comprising a pan and a lid fitted with a gasket to provide sealing between the lid and the pan when the pressure cooker is under pressure.

BACKGROUND OF THE INVENTION

Pressure cookers having an annular sealing gasket made of a deformable material for the purpose of providing sealing between a pan and a lid are known.

The safety aspects of pressure-cooker operation are also well known. High pressure exists inside the appliance during cooking and excess pressure is potentially dangerous. To improve the safety systems on pressure cookers, various safety devices that are activated simultaneously or in succession in the event that a maximum operating pressure is exceeded have been used. It is well known to provide pressure cookers with one or more safety devices including one or more safety valves coexisting with a safety device that relies on deforming the sealing gasket.

It is also known to use a sealing gasket that is extruded through an opening in the side wall of the lid in the event of excess pressure. The gasket moves outwardly as it extrudes through the opening. As the gasket is extruded, the bottom lip of the gasket moves downwardly beyond its sealing position, so that fluid escapes downwardly along the walls of the pan of the pressure cooker. Although such a device provides the pressure cooker with additional safety, it suffers from disadvantages. The lid must be formed with an opening during manufacture. In addition, the sudden escape of fluid down the sides of the appliance can extinguish the heater element and cause a safety problem. A scalding fluid is squirted from the pressure cooker under pressure and may be squirted onto the user.

To improve such a device, and in particular to diminish the violent effects of the gasket being extruded, gaskets with special shapes have been envisioned. The gasket extrusion window in the lid is eliminated, and a series of notches around the entire inner and outer periphery of the annular gasket are formed. The notches are associated in pairs with internal nicks. In operation, in the event of excess pressure, the gasket deforms radially at one or more notch/nick pairs, causing the fluid to escape progressively towards the bottom of the appliance. Such a device ensures that the fluid leaks in relatively progressive manner towards the outside. However, the manufacture of the annular gasket is complicated by the multiplicity of shapes to be provided. Leaks may occur in normal operation. Numerous notch/nick pairs around the periphery of the gasket are required to ensure that there is at least one notch/nick pair that is operational when the gasket is in place between the ramps on the pan and the lid. The ramps on the pan can interfere with downward displacement of the lips of the gasket over certain annular sectors.

To attempt to solve the above-mentioned problems, the gasket is provided on its periphery with two radial tongues. The radial tongues are arranged to be inserted in an opening formed in the peripheral side edge of the lid to index rotation of the gasket with rotation of the lid. The gasket has a notch in its inner periphery geometrically associated with indexing nicks to ensure that the gasket is extruded through the opening.

Such a safety device nevertheless suffers from the drawback of requiring an extrusion opening to be made in the lid. Furthermore, the above-mentioned drawbacks concerning extrusion of the gasket remain. Such a device does not prevent mounting a standard gasket in the lid of the pressure cooker. A gasket which is not specially designed to be fitted to such a pressure cooker, having no indexing nicks, may be used with the pressure cooker. Such incorrect operation of the appliance degrades its safety in use.

Another example of an indexed gasket is described in detail by German Patent No. 1076922, which proposes two studs in the lid arranged to be inserted in two openings in the gasket so as to index the position of the lid. As in all known embodiments of indexing gaskets, a window in the drop edge of the lid is provided for extrusion of the gasket through the window in the event of excess pressure. The disadvantages of that solution are the same as those mentioned for the preceding device that implements an indexed gasket.

SUMMARY OF THE INVENTION

An indexing safety gasket adapted to the mounted in the lid of a pressure cooker to seal the lid and the pan of the pressure cooker comprises a fastening element on the gasket adapted to cooperate with a fastening element on the lid for indexing rotation of the gasket with rotation of the lid, and a periphery having at least one outer notch to enable the gasket to deform radially at the outer notch in the event of the pressure cooker becoming excessive. The gasket may have at least one outer notch comprising a curved regular cutout extending substantially over the full height of the gasket. The at least one outer notch may comprise at least two outer notches.

The fastening element on the gasket may comprise a male element and the fastening element on the lid may comprise a female element. In other embodiments, the fastening element on the lid comprises a male element and the fastening element on the gasket comprises a female element. The male element may be formed by a projection crimped to the lid and adapted to penetrate into the female element, which comprises an orifice.

The projection may be secured to a top face of the lid and the orifice may be formed in the gasket so that the orifice extends in a direction that is substantially perpendicular to the plane in which the gasket extends. The projection may be secured to a peripheral drop edge of the lid and the orifice may be formed in the gasket in a substantially radial direction. The male element may comprise an integral portion of the gasket and the female element may comprise an opening formed through the lid.

The male element may comprise a stud integral with the body of the gasket, on a top portion of the gasket and the stud may be adapted to penetrate in the opening of the lid.

In other embodiments, the male element comprises a stud integral with the body of the gasket and extending radially from a leading edge of the gasket and the stud is adapted to penetrate in the opening of the lid.

In another aspect of the invention, a pressure cooker comprises a pan, a lid and a gasket adapted to be mounted in the lid, the gasket comprising a fastening element on the gasket and adapted to cooperate with a fastening element on the lid for indexing rotation of the gasket with rotation of the lid, and a periphery having at least one outer notch to enable the gasket to deform radially at the outer notch in the event of the pressure inside the pressure cooker becoming excessive.

The lid preferably has a flow hole formed through the lid so that the gasket progressively uncovers the flow hole to enable air to leak out progressively from the flow hole when the gasket deforms radially. The at least one outer notch may comprise at least five outer notches.

BRIEF DESCRIPTION OF THE DRAWINGS

These and other features, aspects and advantages of the present invention will become better understood with regard to the following description, appended claims and drawings where:

DETAILED DESCRIPTION

Figure 1:
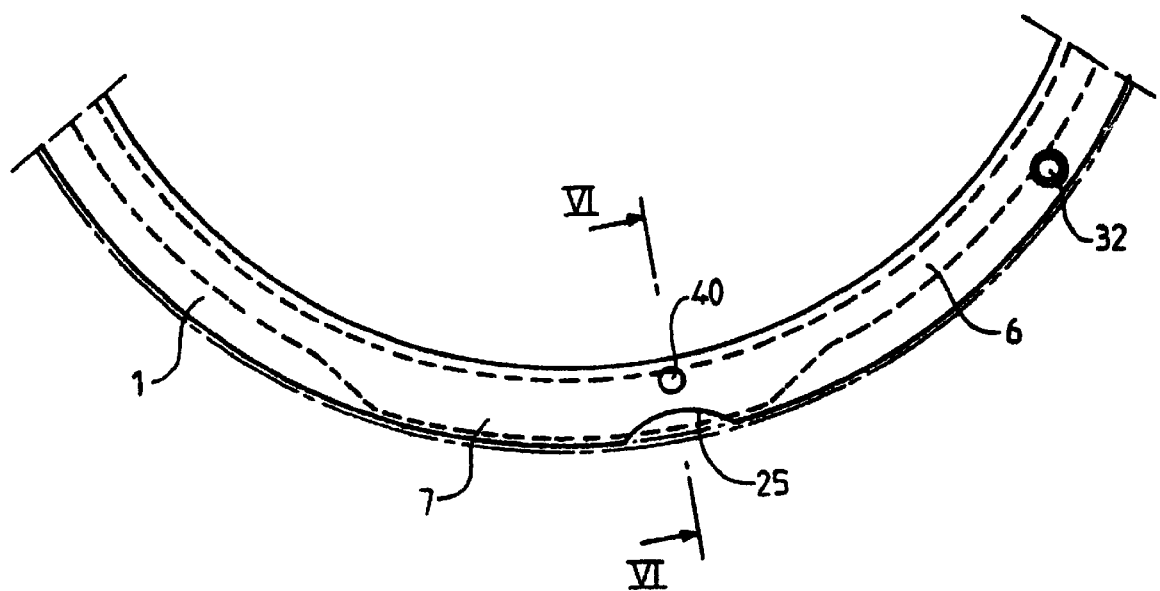
FIG. 1 is a fragmentary plan view of a pressure cooker with a safety gasket in accordance with an embodiment of the invention.

An embodiment of the invention is shown in FIGS. 1–2, 6 and 7.

FIGS. 1–2, 6 and 7 show a bayonet pressure cooker comprising a pan 3 having a bottom (not shown in the figures) and side walls 4. The pan may be made by stamping from metal. The pan may have a substantially circular cross-section.

The pressure cooker 2, in this embodiment, is a bayonet-closure type pressure-cooker. The pan 3 has a top rim 6 projecting radially outwardly from the top of the side wall 4. The top rim 6 has a periphery with a set of ramps 7 (FIG. 1) that are uniformly distributed around the periphery of the top rim 6. The pressure cooker 2 also has a lid 10 having a series of counter-ramps. The ramps 7 on the pan 3 are arranged to form a bayonet-closure system with the counter-ramps of the lid 10.

The lid 10 has a peripheral outer portion arranged to serve as a seat for receiving the gasket 1, as shown in FIGS. 1–2, 6 and 7. The lid 10 has a drop peripheral edge 12 that extends from the top face 11 of the lid.

The gasket 1 has an annular shape and is made of a deformable elastomeric material, such as silicone. The gasket 1 has a bead 21 forming the central portion of the gasket 1 with a periphery with an outer face. The outer face forms a leading edge 22 for pressing against the inside face of the drop edge 12.

The gasket 1 has, projecting from the bead 21 and away from the leading edge 22, two terminal lips 23A and 23B respectively forming a top lip 23A and a bottom lip 23B.

Figure 6:
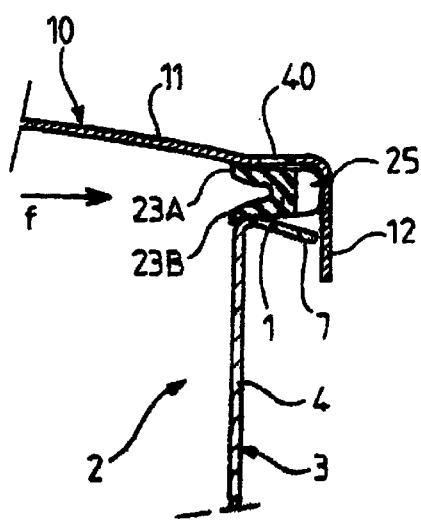
FIG. 6 is a fragmentary cross-section view taken on line VI—VI of FIG. 1, showing a safety gasket in its rest position.
Figure 7:
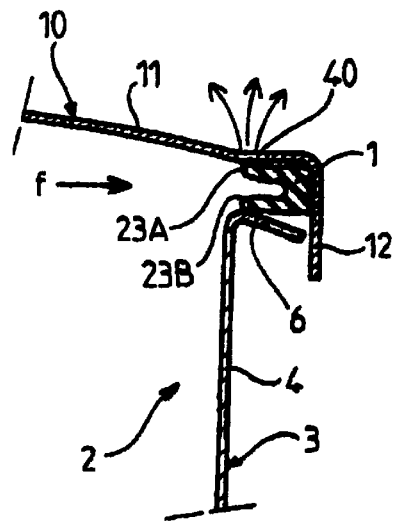
FIG. 7 is the fragmentary cross-section view of FIG. 6, showing a gasket in its active disengagement position.

The leading edge 22 of the bead 21 is recessed to form an outer notch 25 in the periphery of the safety gasket 1. (FIGS. 1 and 6). Preferably, the outer notch 25 is in the form of a curved and regular cutout extending over substantially the full height of the leading edge 22 of the gasket 1, and its concave face faces outwardly from the gasket. Instead of having a cutout of regular concave shape, other shapes could naturally be used, for example a U-shape, a V-shape, a W-shape, . . . , without going beyond the ambit of the invention. The safety gasket 1 of the invention may have a plurality of outer notches 25 and may be distributed at regular intervals around its periphery. Nevertheless, the preferred embodiment of the invention has only a single notch 25. In the event of excess pressure inside the pressure cooker 2, the function of the outer notch 25 is to allow the gasket to deform radially at the notch 25, so as to enable the leading edge 22 situated in the outer notch 25 to come into contact with an inside face of the drop edge 12 (FIGS. 6 and 7).

The safety gasket 1 is indexed by relative fastening elements 30 between the gasket 1 and the lid 10 so as to index rotation of the gasket 1 with rotation of the lid 10. In this way, the safety gasket 1 of the invention is installed in the lid 10 in a single position only, and the gasket 1 rotates with the lid 10, through the same angle, relative to the pan 3.

Preferably, the fastening elements 30 comprises a male element and a female element designed to co-operate mutually in order to fix the gasket 1 relative to the lid 10.

Figure 2:
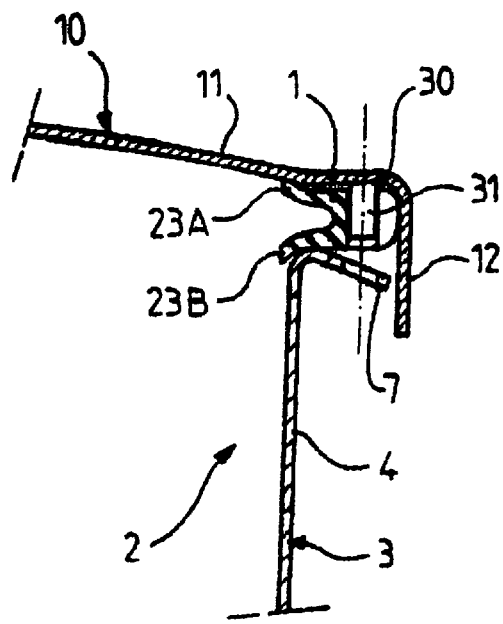
FIG. 2 is a fragmentary cross-section of a pressure cooker with a gasket in the lid in accordance with the embodiment of FIG. 1.
Figure 3:
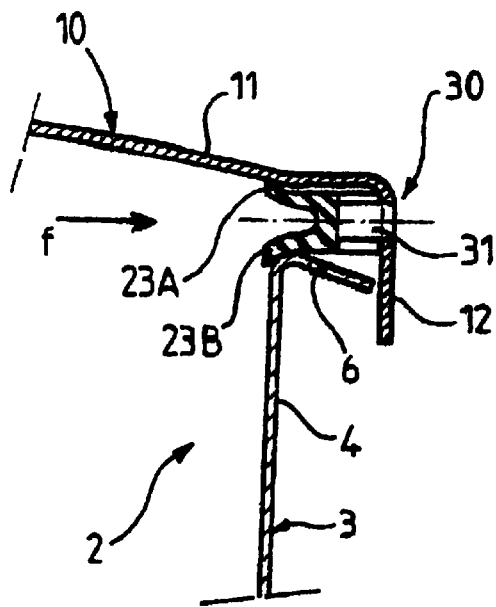
FIG. 3 is a fragmentary cross-section view of a pressure cooker with a safety gasket in the lid in accordance with another embodiment of the invention.

In the embodiment shown in FIG. 2 and the embodiment shown in FIG. 3, the male element comprises a projection 31 and is supported by or integral with the lid 10. The projection 31 may comprise a pin or a stud and is preferably fixed to the lid by crimping. The female element, in these embodiments, is formed in the body of the gasket 1. The male element is arranged to penetrate into the female element, which comprises an orifice 32 formed through the bead 21 of the gasket 1 of these embodiments.

In the embodiment of FIG. 2, the projection 31 is secured to the top face 11 of the lid 10 and extends from an inside face thereof. The projection 31 is located close to the drop edge 12 and extends substantially parallel thereto. The projection 31 is preferably made of metal and is preferably fixed to the lid 10 by crimping. In this embodiment, the orifice 32 is formed in the bead 21 on an axis that is substantially perpendicular to the plane in which the gasket 1 extends so that the projection 31 can penetrate into said orifice 32 when the gasket 1 is put into place in the lid 10, as shown in FIG. 2.

The embodiment shown in FIG. 3 differs from that shown in FIG. 2 in that the fastening means has a different geometrical orientation. In the embodiment of FIG. 3, this orientation is radial with respect to the gasket and the lid. The projection 31 is secured to the inside face of the drop edge 12 of the lid 10 and extends radially toward the center of the pressure cooker 2. The orifice 32 is formed in the bead 21 of the gasket 1 starting from its leading edge 22, extending inwardly on an axis that is substantially radial.

Figure 4:
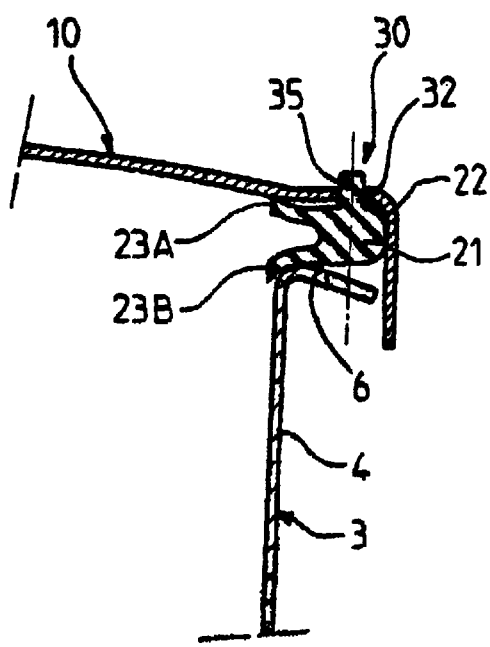
FIG. 4 is a fragmentary cross-section view of a pressure cooker with a safety gasket in the lid in accordance with a further embodiment of the invention.
Figure 5:
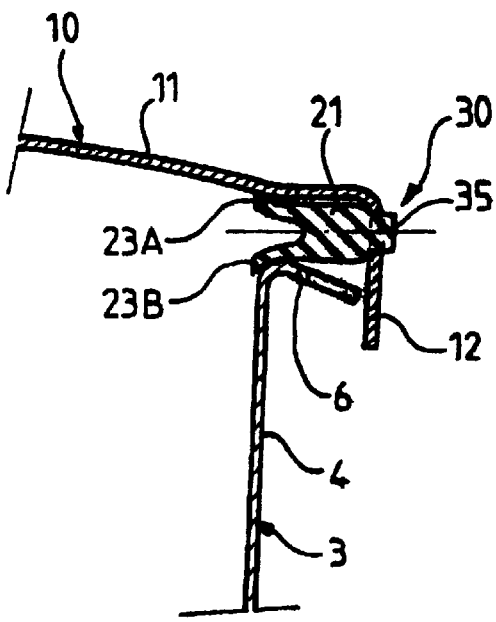
FIG. 5 is a fragmentary cross-section view of a pressure cooker with a safety gasket in the lid in accordance with another embodiment of the invention.

In the embodiments of FIGS. 4 and 5, the male element extends from the body of the gasket 1, and is preferably integral with the bead 21.

Thus, in the embodiment of FIG. 4, the male element is constituted by a stud 35 integral with the body of the bead 21 and extending from its top face towards the lid 10. The stud 35 extends from the central portion of the bead 21 in a direction that is substantially normal to the plane in which the lid 10 extends. In each of the embodiments of FIGS. 2–5, the stud is arranged to penetrate into an opening 32 formed through the top face 11 of the lid 10. The orifice 32 is positioned so that when the gasket 1 is put into place in the lid 10 by inserting the stud 35 in the opening 32, the gasket 1 is positioned to provide seal between the lid 10 and the pan 2.

The embodiment of FIG. 5 differs from that shown in FIG. 4 only by the orientation of the stud 35 and the orifice 32 with respect to the pressure cooker 2. In embodiment of FIG. 5, the stud 35 projects from the body of the bead 21 and extends radially from the leading edge 22. The orifice 32 in the lid is formed in the drop edge 12 so as to be engaged by the stud 35.

The safety device of the invention operates as follows.

With the gasket 1 in position in the lid so that the male element is inserted in the female element, and the lid 10 closed in hermetically sealed manner onto the pan 3, the pressure inside the appliance can rise. When the cooking pressure exceeds a critical value, and assuming that other safety devices have not operated, the gasket 1 is subjected to radial pressure f (FIGS. 3, 6, and 7). The gasket is deformed so that the leading edge 22 in the outer notch 25 is brought into contact with the drop edge 12. During this deformation, the bottom lip 23B moves progressively and radially. The bottom lip 23B moves from a position in which the bottom lip 23B extends inwardly beyond the edge of the rim 6 with the wall 4y over said edge, causing fluid to escape progressively downwardly.

The escape of the bottom lip 23B is preferably encouraged and adjusted by reducing the size of the rim 6 locally at the notch 25. The portion of the rim 6 in registration with the notch 25 may be machined to an angular position.

With the fastening means of the gasket and lid, the gasket has a profile that is specific to the lid and prevents a standard gasket from being mounted in the lid. The safety aspects of the pressure cooker are thus reinforced, since it is possible to install only the appropriate gasket in the pressure cooker. The safety device operates with maximum effectiveness.

Figure 8:
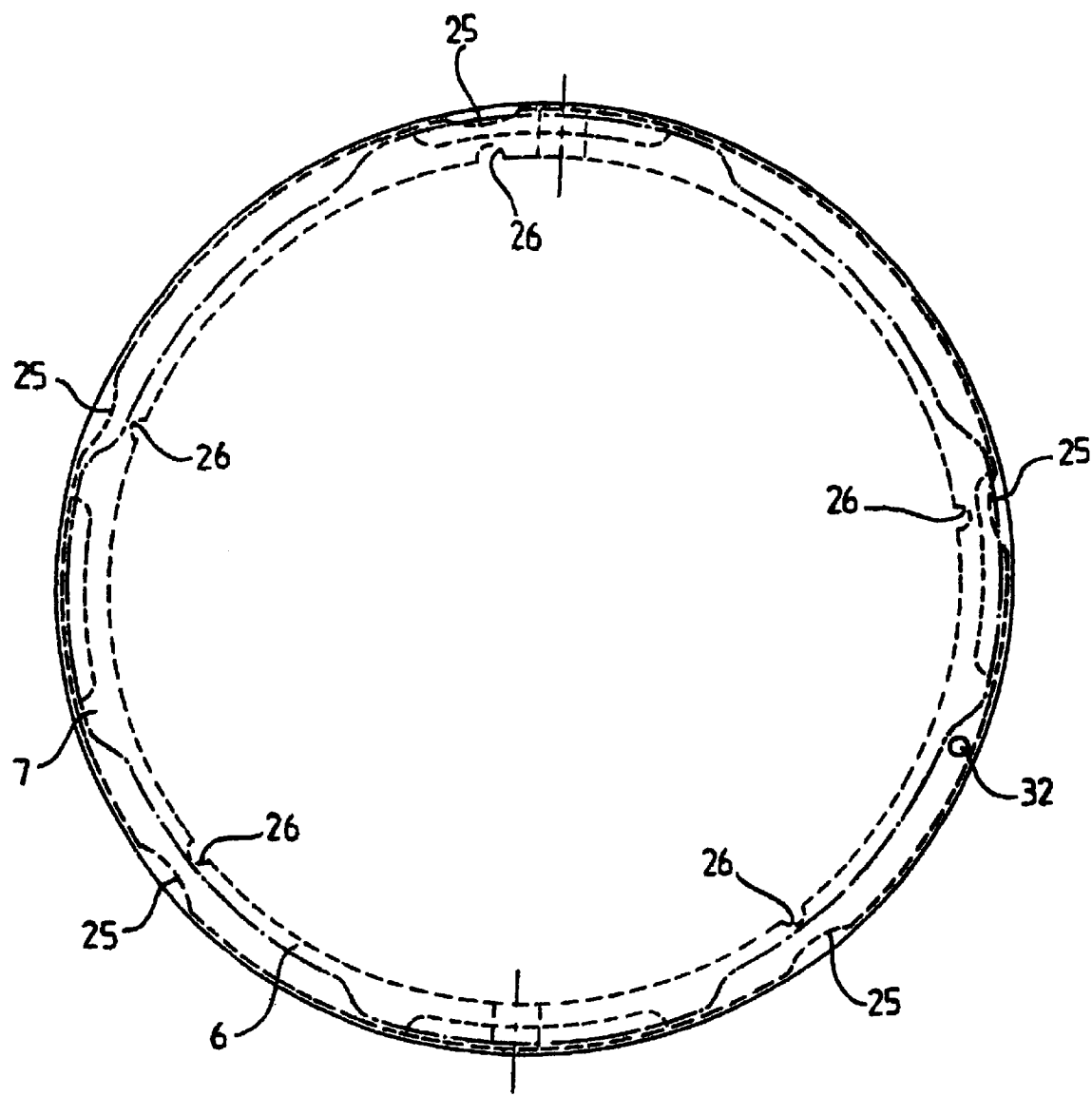
FIG. 8 is a plan view of a pressure cooker with a gasket in accordance with a further embodiment of the invention, showing the lid in a locked position.

Furthermore, the design of the gasket 1 is considerably simplified since, an outer notch 25 and an orifice 32 or a stud 35 is formed on the gasket and lid. For safety reasons, and in particular to avoid incorrect placement of the gasket if the gasket has been turned inside-out, the gasket is provided with a plurality of notches, such as two notches 25 or a series of five outer notches 25, as shown in FIG. 8. In this embodiment, the outer notches 25 are uniformly distributed around the periphery of the gasket 1. Each of outer notch 25 is associated with a pair of internal notches 26 formed in each of the lips 23A and 23B. Each internal notch 26 is located in registration with a corresponding outer notch 25. This embodiment improves the safety of the gasket 1, should the gasket 1 become deformed in an undesirable manner. Finally, an indexed gasket in accordance with embodiments of the invention makes it possible to control and accurately locate the leakage zone from the pressure cooker since the position of the gasket is accurately known and repeatable. In all, the safety aspects and simplicity of design are thus greatly improved.

The pressure cooker preferably has a lid 10 with a flow hole 40 (FIGS. 1, 6, and 7) formed through its top face 11. The hole is made through the lid 10 so that when the gasket 1 is put into place and indexed relative to the lid 10, the hole 40 is substantially in registration with the outer notch 25, and is preferably centered with respect to the notch 25. Radial displacement of the gasket 1 enables the top lip 23A to progressively uncover the opening 40 (FIGS. 6 and 7) so as to allow leakage to take place progressively upwardly from the lid 10, into the air, as the gasket is displaced radially outwardly.

The relative fastening elements 30 between the gasket and the lid can be made in any angular position on the pressure cooker 2.

What is claimed is:

1. An indexing safety gasket adapted to be mounted in the lid of a pressure cooker to seal the lid and the pan of the pressure cooker, comprising a fastening element on said gasket adapted to cooperate with a fastening element on the lid for indexing rotation of the gasket with rotation of the lid, and a periphery having at least one outer notch to enable the gasket to deform radially at the outer notch in the event of the pressure inside the pressure cooker becoming excessive.

2. A gasket according to claim 1, wherein said at least one outer notch comprises a curved regular cutout extending substantially over the full height of the gasket.

3. A gasket according to claim 1, wherein said at least one outer notch comprises at least two outer notches.

4. A gasket according to claim 1, wherein said fastening element on said gasket comprises a male element and said fastening element on said lid comprises a female element.

5. A gasket according to claim 1, wherein said fastening element on said lid comprises a male element supported by the lid, and said fastening element on said gasket comprises a female element formed in the gasket.

6. A gasket according to claim 5, wherein said male element is formed by a projection crimped to the lid and adapted to penetrate into said female element, said female element comprising an orifice formed in the gasket.

7. A gasket according to claim 6 wherein said projection is secured to a top face of the lid, said orifice being formed in the gasket so that said orifice extends in a direction that is substantially perpendicular to the plane in which the gasket extends.

8. A gasket according to claim 7, wherein said projection is secured to a peripheral drop edge of the lid, said orifice being formed in the gasket in a substantially radial direction.

9. A gasket according to claim 4, wherein said male element comprises an integral portion of the gasket, the female element being an opening formed through the lid.

10. A gasket according to claim 9 wherein said male element comprises a stud integral with the body of the gasket, on a top portion of the body of the gasket, said stud being adapted to penetrate in the opening of the lid.

11. A gasket according to claim 9, wherein said male element comprises by a stud integral with the body of the gasket and extending radially from a leading edge of the gasket, said stud being adapted to penetrate in the opening of the lid.

12. A pressure cooker, comprising a pan, a lid, and the gasket according to claim 1.

13. A pressure cooker according to claim 12, wherein said lid has a flow hole formed through said lid, said gasket progressively uncovering said flow hole to enable air to leak out progressively from said flow hole when said gasket deforms radially.

14. The pressure cooker according to claim 1, wherein said at least one outer notch comprises at least five outer notches.

* * * * *

UNITED STATES PATENT AND TRADEMARK OFFICE
CERTIFICATE OF CORRECTION

| | | |
|---|---|---|
| PATENT NO. | : 6,695,319 B1 | |
| APPLICATION NO. | : 09/762669 | |
| DATED | : February 24, 2004 | |
| INVENTOR(S) | : Daniel Jean-marie Anota and Eric Chameroy | |

It is certified that error appears in the above-identified patent and that said Letters Patent is hereby corrected as shown below:

Please delete the Abstract as filed and substitute therefor the attached revised Abstract.

Signed and Sealed this

Eighth Day of August, 2006

JON W. DUDAS
*Director of the United States Patent and Trademark Office*

ABSTRACT OF THE DISCLOSURE

An indexing safety gasket adapted to be mounted in the lid of a pressure cooker for sealing the lid and the pan of the pressure cooker. The gasket comprises at least one outer notch in its periphery, and means for fastening the gasket relative to the lid so as to index rotation of the gasket to rotation of the lid.

UNITED STATES PATENT AND TRADEMARK OFFICE
CERTIFICATE OF CORRECTION

| | |
|---|---|
| PATENT NO. | : 6,695,319 B1 |
| APPLICATION NO. | : 09/762669 |
| DATED | : February 24, 2004 |
| INVENTOR(S) | : Daniel Jean-marie Anota and Eric Chameroy |

It is certified that error appears in the above-identified patent and that said Letters Patent is hereby corrected as shown below:

Please delete the Abstract as filed and substitute therefor the attached revised Abstract.

Column 2, line 22, "the mounted" should read --be mounted--
Column 4, line 26, "comprises" should read --comprise--
Column 5, line 10, "In embodiment" should read --In the embodiment--
Column 5, line 42, "since, an" should read --since an--
Column 5, line 49, "of outer notch" should read --of outer notches--
Column 6, line 51, "comprises by a stud" should read --comprises a stud--

This certificate supersedes Certificate of Correction issued August 8, 2006.

Signed and Sealed this

Fourteenth Day of November, 2006

JON W. DUDAS
*Director of the United States Patent and Trademark Office*

ABSTRACT OF THE DISCLOSURE

An indexing safety gasket adapted to be mounted in the lid of a pressure cooker for sealing the lid and the pan of the pressure cooker. The gasket comprises at least one outer notch in its periphery, and means for fastening the gasket relative to the lid so as to index rotation of the gasket to rotation of the lid.